(12) United States Patent  
Whitener et al.

(10) Patent No.: US 8,541,916 B2
(45) Date of Patent: Sep. 24, 2013

(54) NUT SECURING ARRANGEMENT FOR ELECTRICAL GENERATOR

(75) Inventors: Randy E. Whitener, Oviedo, FL (US); Stephen T. Soto, Maitland, FL (US); Neil R. Smith, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 666 days.

(21) Appl. No.: 12/640,090

(22) Filed: Dec. 17, 2009

(65) Prior Publication Data

US 2011/0148231 A1 Jun. 23, 2011

(51) Int. Cl.
*H02K 11/00* (2006.01)

(52) U.S. Cl.
USPC .................................................. 310/71

(58) Field of Classification Search
USPC ............... 310/71; 81/64; 411/108, 113, 178
See application file for complete search history.

(56) References Cited

U.S. PATENT DOCUMENTS

| | | | |
|---|---|---|---|
| 4,066,921 A | 1/1978 | Blank | |
| 4,105,058 A * | 8/1978 | Bunn et al. | 411/113 |
| 4,387,947 A | 6/1983 | Lostumo et al. | |
| 4,971,497 A * | 11/1990 | Stoffer et al. | 411/108 |
| 5,015,895 A * | 5/1991 | Obley | 310/71 |
| 5,273,398 A | 12/1993 | Reinfelder et al. | |
| 5,382,856 A | 1/1995 | Keck et al. | |
| 5,915,902 A | 6/1999 | Patterson et al. | |
| 5,988,965 A | 11/1999 | Fiorell et al. | |
| 6,104,116 A | 8/2000 | Fuller et al. | |
| 6,784,597 B1 | 8/2004 | Hess et al. | |
| 6,966,736 B2 | 11/2005 | Wolf et al. | |
| 2006/0062652 A1 * | 3/2006 | Ward et al. | 411/181 |
| 2009/0108668 A1 * | 4/2009 | Kamikawa et al. | 301/109 |

FOREIGN PATENT DOCUMENTS

GB 771819 4/1957

* cited by examiner

*Primary Examiner* — Tran Nguyen
*Assistant Examiner* — Leda Pham

(57) ABSTRACT

A system for securing a nut (24) used to compress a compliant seal (23) surrounding a radial conductor lead (21) of an electric generator (10). The generator has a rotor (11) with the radial conductor lead arranged in a radial lead bore (20) of the rotor and the seal coaxially arranged surrounding the radial lead. A receiving pocket (15) is arranged in a body of the rotor adjacent to the radial lead bore. The nut is arranged coaxially with the radial conductor lead, the nut including a seal contacting surface (35) and a ligament (26) arranged opposite the seal contacting surface, wherein a portion of the ligament is deformed into the receiving pocket to lock the nut against rotation, thereby maintaining a desired degree of compression on the seal.

13 Claims, 4 Drawing Sheets

NUT SECURING ARRANGEMENT FOR ELECTRICAL GENERATOR

FIELD OF THE INVENTION

The present invention relates generally to the field of electrical generators, and more specifically to a system for securing a radial lead nut of an electrical generator.

BACKGROUND OF THE INVENTION

Turbomachines include a rotational shaft known as a rotor and a stationary portion known as a stator. Turbomachines include, but are not limited to steam turbines, gas turbines, electrical generators, compressors, and pumps. For example, an electrical generator typically includes main components like a rotor and stationary electrical conductors. The rotor typically includes rotor electrical conductors that produce a magnetic field when energized with an electric current.

The rotor of a generator receives the energizing current from an energizing device coupled to an end of the rotor. The rotor typically contains conductors that mate to the energizing device and route the energizing current along the rotor axial centerline via an axial conductor. A radial lead conductor then routs the energizing current radially from the rotor centerline to the rotor surface where the energizing current is then directed to the magnetic field generating conductors.

If the energizing current is direct current, then the magnetic field produced is constant in magnitude. However, as the rotor rotates, the field strength at a stationary point will vary as the magnetic field poles pass by. The stationary electrical windings surround the rotor and are arranged to intersect the rotating magnetic field such that an alternating current is induced in the stationary electrical windings. The stationary windings are connected to an electrical network such that the induced alternating current is distributed to many users.

Operation of the generator produces heat within the internal components of the generator. Typically, generators are cooled by a cooling medium, such as air, water or hydrogen gas. In the case of hydrogen gas, care must be taken to prevent mixing of the hydrogen gas with the surrounding air to avoid an explosive mixture of hydrogen and oxygen. Typically, hydrogen cooled generators are operated under positive pressure and high hydrogen purity to ensure that a combustible mixture of hydrogen and oxygen does not result within the generator. A hydrogen cooled generator is typically enclosed within a strong shell-like frame that supports the weight and operational and transient loads of the generator, and also contains the hydrogen gas and prevents it from escaping into the atmosphere where it can form a combustible mixture.

In order to prevent a hydrogen gas leak path along the radial lead conductor, the conductor is sealed against surrounding structures. One means of sealing against hydrogen gas leakage is to employ deformable seals stacked around the radial lead conductor, thereby forming a gas tight barrier between the radial lead conductor and the rotor body. The deformable seals are compressed by a radial lead nut that surrounds the radial lead conductor and threads into the rotor body. The axial compression of the seals causes the seals to expand radially, forming a gas tight seal against the surrounding rotor structure. The compression of the deformable seals is critical to maintain proper sealing during operation. The amount of compression of the seals is determined at assembly of the rotor by the extent that the radial lead nut is threaded into the rotor body. In order to preserve the correct compression of the deformable seals, the radial lead nut should advantageously be restrained from further rotation, either clockwise or counter clockwise, with respect to the rotor body.

Typically, to prevent undesirable rotation of the radial lead nut, a portion of the rotor body is deformed into the radial lead nut using a blunt tool such as a punch and a hammer. The hammer is used to impact the tool to plastically deform a portion of the rotor body into the threads or receiving slots of the radial lead nut, thereby binding the radial lead nut and preventing unwanted rotation. Deforming the rotor body material into the radial lead nut to prevent rotation is a well known process known as staking. However, the deformed rotor body material resulting from staking can lead to undesirable stress risers and crack initiation sites.

BRIEF DESCRIPTION OF THE DRAWINGS

The invention is explained in the following description in view of the drawings that show.

DETAILED DESCRIPTION OF THE INVENTION

The present invention is disclosed in the context of securing a nut relative to a rotor within an electric generator of an electric power production facility. The principles of the present invention, however, are not limited to use with an electric generator or within an electricity power production facility. For example, the methods and/or systems could be used within the aerospace, transportation or manufacturing industries or any other area where fixation of a rotatable component is needed relative to a stationary component. One skilled in the art may find additional applications for the systems, kits, and arrangements disclosed herein. Thus the illustration and description of the present invention in context of the exemplary electric generator is merely one possible application of the present invention. However the present invention has particular applicability for use as a means of fixing a component against rotation within an electric generator.

Figure 1:
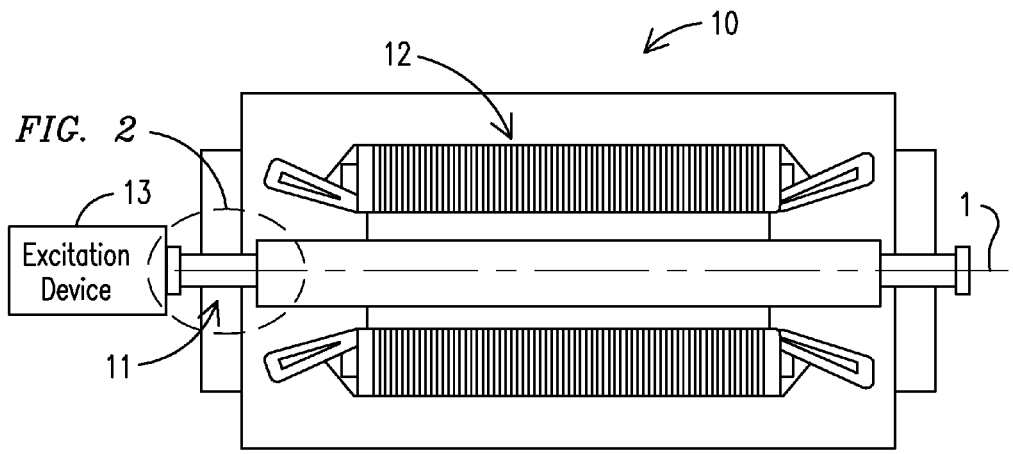
FIG. 1 is a longitudinal view of an electric generator.

Referring to FIG. 1, a hydrogen cooled electric generator 10 typically comprises a rotor 11 centered along a centerline 1 and surrounded by a stator of the generator 10. The rotor 11 is connected to an electrical excitation device 13 that electrically energizes the rotor 11. Opposite the excitation device 13 is a prime mover (not shown for clarity) that operatively rotates the rotor. The rotor 11 contains electrical rotor conductors that are connected to the excitation device 13 that provides an excitation current in the rotor conductors. The excitation current in the rotor conductors creates a magnetic field of variable strength proportional to the magnitude of the provided current. The rotor 11 operatively rotates while producing the aforementioned magnetic field. The rotating magnetic field induces an alternating current in the stator 12 that surrounds the rotor 11. The stator then is electrically connected to a power distribution network that carries the induced alternating current to users.

Figure 2:
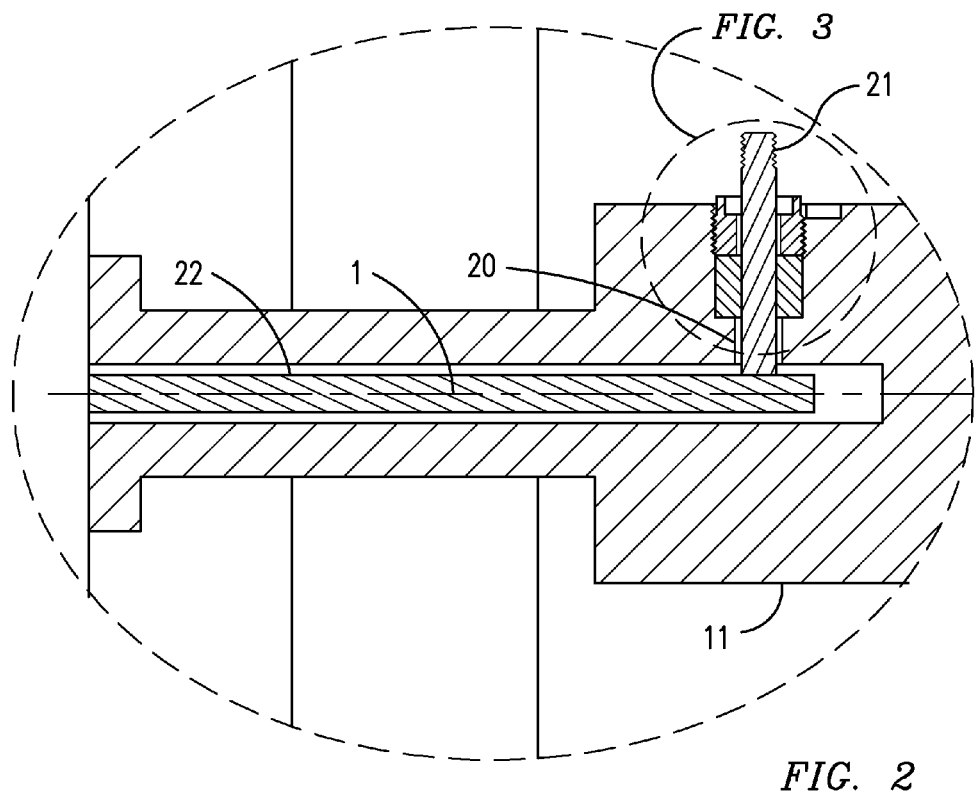
FIG. 2 is a detailed cut-away view of the generator rotor exciter end.
Figure 3:
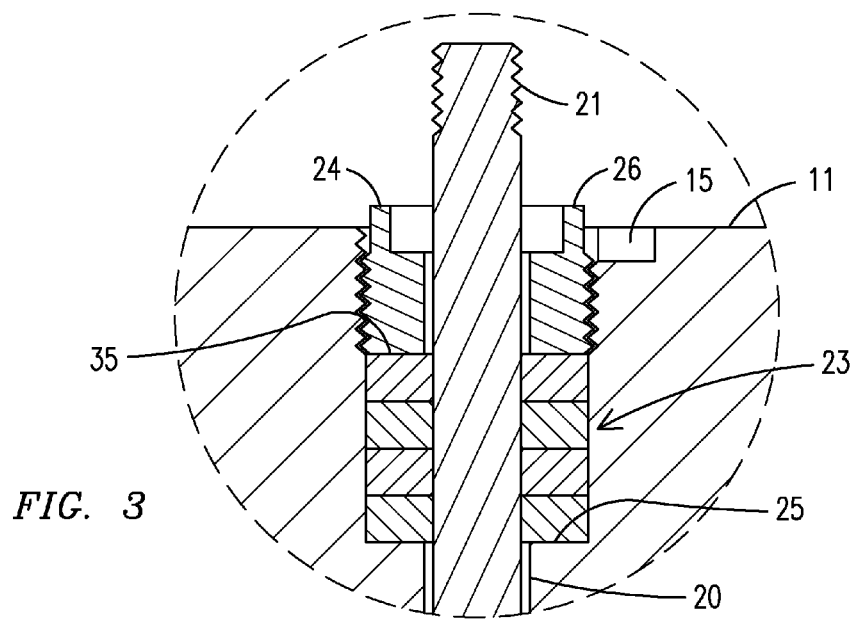
FIG. 3 is a detailed view of the rotor radial lead.

The excitation current is conducted between the excitation device 13 and the rotor conductors via an axial conductor 22 and a radial lead conductor 21 as seen in FIG. 2. The axial conductor 22 is arranged along the rotor centerline 1. The radial lead conductor 21 intersects the axial lead 22 and conducts the excitation current radially from the rotor centerline 1 to the rotor outer diameter for electrical connection to the rotor field conductors. The radial lead 21 is set within a radial lead bore 20 as seen in FIGS. 2 and 3. There is a radial clearance between the radial lead 21 and the radial lead bore 20 which could permit leakage of hydrogen cooling gas absent a positive sealing mechanism.

To seal the hydrogen cooling gas, a seal, or a plurality of seals, 23 can be employed which seals the radial gap between the radial lead bore 20 and the radial lead 21 when compressed between nut 24 and shoulder 25 as seen in FIG. 3. The compression of the seals 23 is a function of the radial position of the seal contacting surface 35 of nut 24 relative to the shoulder 25. During operation, vibration, centrifugal loading, thermal cycling and other factors can effect the radial position of the seal contacting surface 35 due to rotation of the nut 24 in the radial lead bore 20. Therefore, rotation of the nut 24 affects compression of the seals 23 and ultimately the effectiveness of the seals 23 against leakage of the hydrogen gas. To maintain the proper compression of the seals 23, it is preferable to fix the rotational position of the nut 24.

Figure 4:
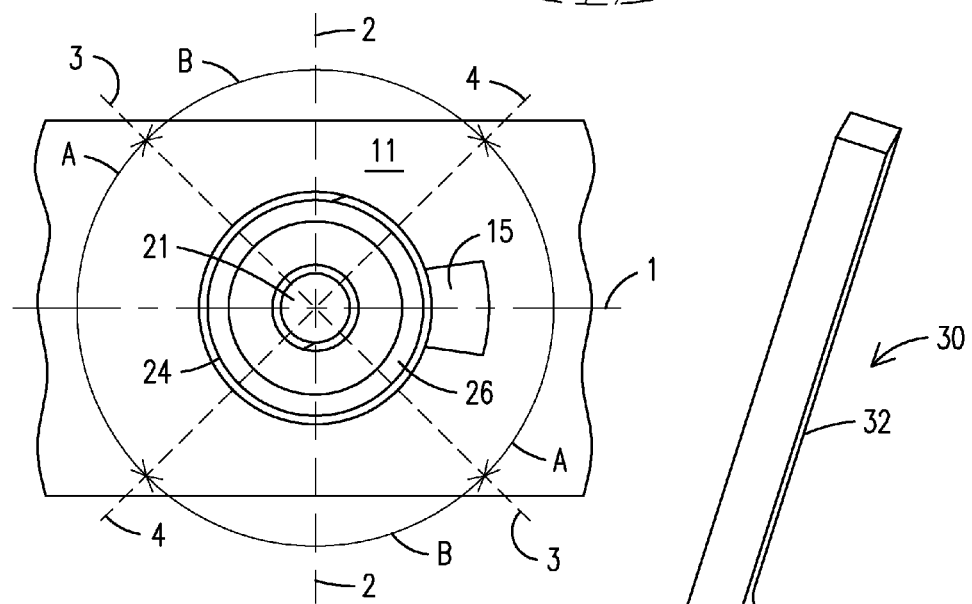
FIG. 4 is a top view of FIG. 3.

As seen in FIG. 3, a receiving pocket 15 is provided at the outer diameter of the rotor body 11 adjacent to the radial lead bore 20. The receiving pocket 15 can be configured such that the receiving pocket 15 opens into the radial lead bore as seen in FIGS. 3 and 4. However, the receiving pocket can be configured such that the receiving pocket 15 does not open into the radial lead bore 20. In either case, the pocket 15 is adjacent the bore for receiving a deformed portion of a radial lead nut, as described more fully below.

The cyclic stress state during rotor operation is at a relatively minimum value along the rotor centerline axis 1 and at a relatively maximum along an axis 2 that is perpendicular to the rotor centerline as seen in FIG. 4. The operative stress state of the rotor therefore is a gradient between the rotor centerline axis 1 and the perpendicular axis 2. The receiving pocket 15 may therefore be arranged advantageously away from the areas of highest stress. The receiving pocket 15 can be arranged based on the quadrants A and B where the quadrants A contain a location of minimum cyclic stress and quadrants B contain a location of maximum cyclic stress. Specifically, quadrant A is the area of the rotor 11 between the lines 3 and 4 that contains the rotor centerline 1 and quadrant B is the area of the rotor 11 between the lines 3 and 4 that contains axis 2 as seen in FIG. 4. Therefore, the receiving pocket 15 may be arranged in quadrant A rather than in quadrant B. Furthermore, it is desirable to avoid arranging the receiving pocket 15 along axis 2 where the operative cyclic stresses are a maximum. Furthermore, the receiving pocket 15 is preferably formed in accordance with common engineering practices having smooth surfaces and radiuses to avoid sharp corners that can result in stress concentrations, reducing the likelihood of crack initiation and potential rotor failure.

The receiving pocket 15 is further configured to receive a deformable portion of the nut 24. The deformable portion of the nut 24 can be embodied as a radially outermost ligament 26 as seen in FIGS. 5 and 6.

Figure 5:
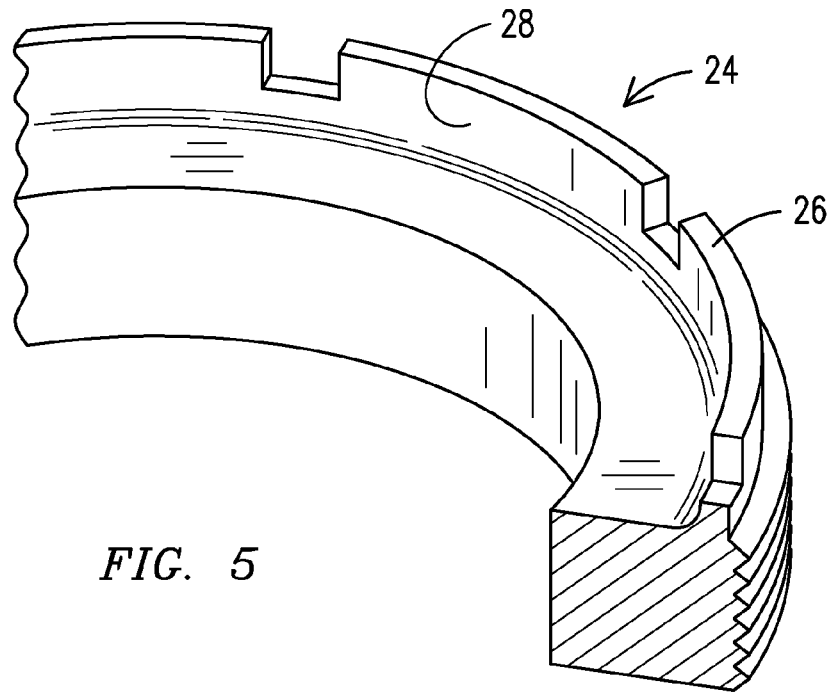
FIG. 5 is an embodiment of the nut of FIG. 3.

FIG. 5 shows a particular embodiment of the nut 24 where the radially outermost ligament 26 is the sole ring like protrusion extending up from an axial surface of the nut 24 opposite the seal contacting surface 35. The radially innermost side of the radially outermost ligament 26 defines a tool contacting surface 28 as seen in FIG. 5, where the tool contacting surface 28 is configured to interface with a tool for deforming the radially outermost ligament 26 into the receiving pocket 15.

Figure 6:
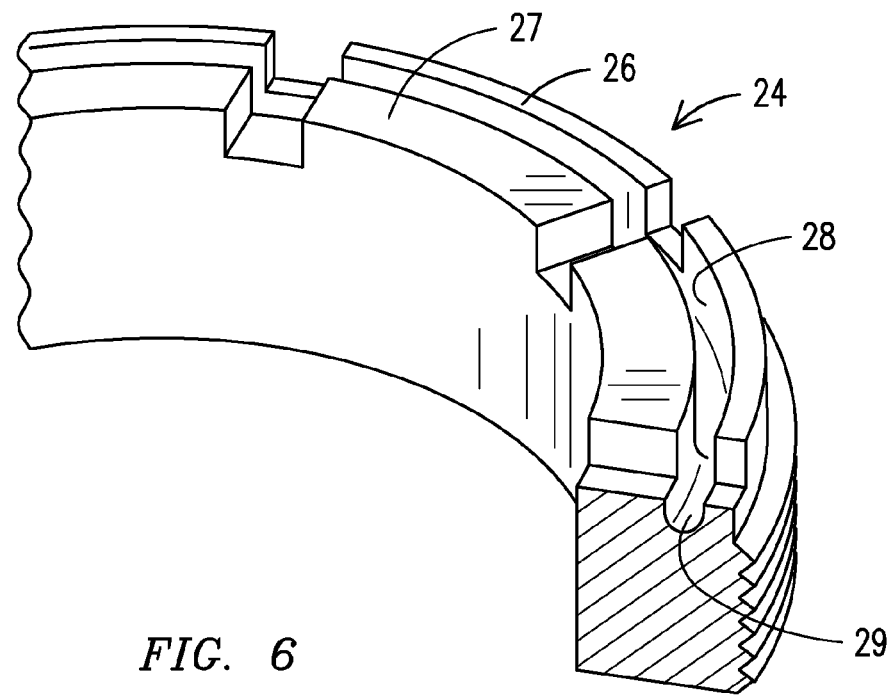
FIG. 6 is a further embodiment of a radial lead nut.

FIG. 6 shows an alternate embodiment of the nut 24 where the radially outermost ligament 26 is separated from a radially innermost ligament 27 by a groove 29. The groove 29 defines a tool contacting surface 28 configured to receive a tool 30. Nut 24 may be a spanner nut as embodied in FIGS. 5 and 6 but also may be of another configuration where the specific configuration for rotating the nut 24 is not a limiting factor of the invention.

Figure 7:
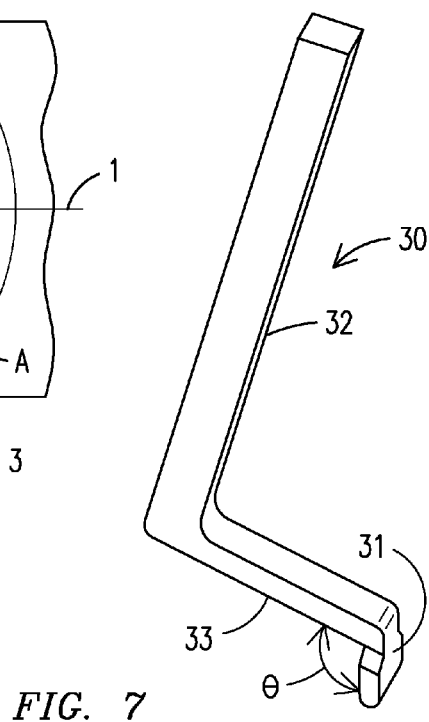
FIG. 7 is an embodiment of tool.
Figure 8:
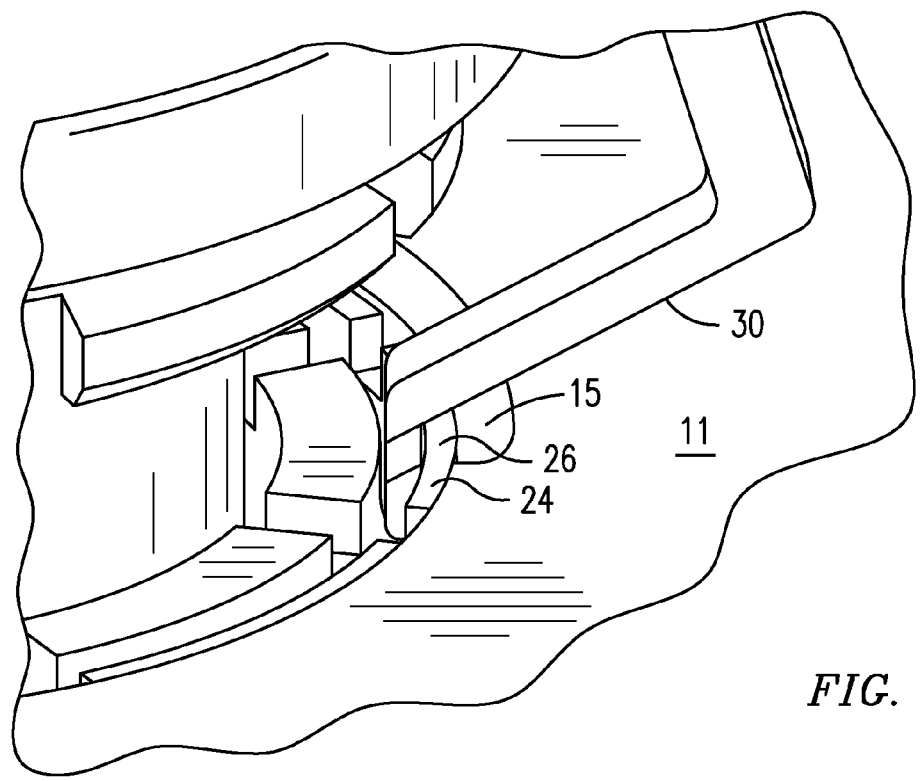
FIG. 8 shows the tool of FIG. 7 at the beginning of use.
Figure 9:
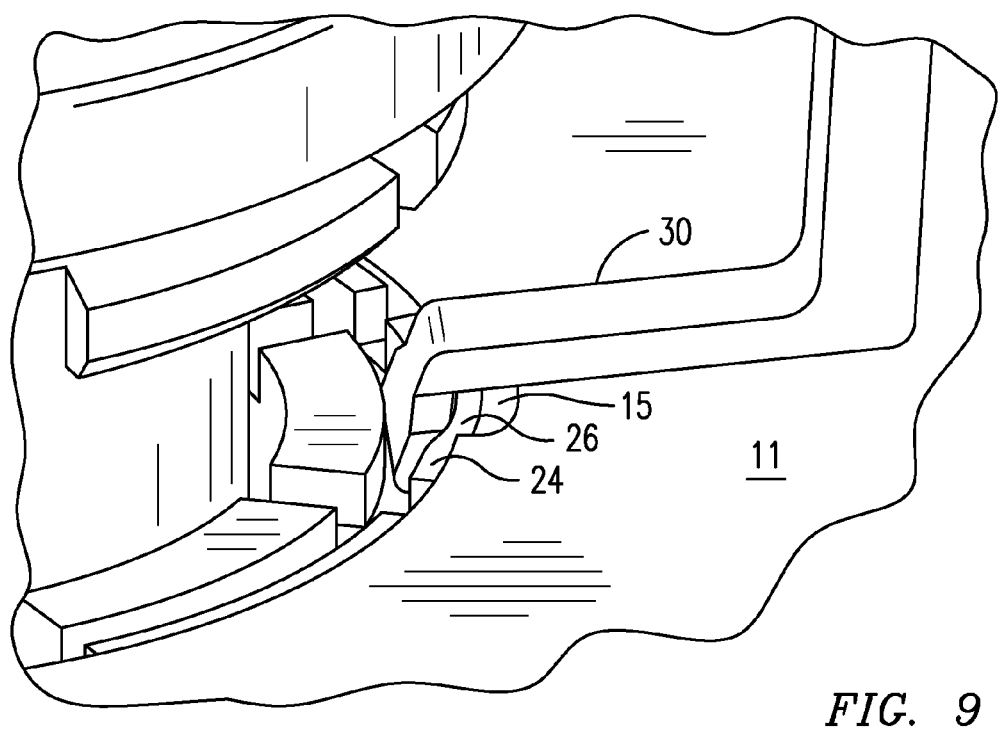
FIG. 9 shows the tool of FIG. 7 at the end of use.

FIG. 7 shows the tool 30 having a nut contacting portion 31 sized and configured for insertion into the groove 29 as seen in FIG. 8. The tool 30 also has a lever portion 32 arranged opposite the nut contacting portion 31. The lever portion 32 is configured for applying a deforming force to the tool contacting surface 28 via the contacting portion 31 that deforms a portion of the radially outermost ligament 26 local to the nut contacting portion 31 into the receiving pocket 15 as seen in FIG. 9. Arranged between the nut contacting portion 31 and the lever portion 32 is a rotor contacting portion 33.

Tool 30 is advantageously designed to sufficiently deform the radially outermost ligament 26 into the receiving pocket 15 while not excessively straining the radially outermost ligament 26 such as to cause cracking of the radially outermost ligament 26 or the base material of nut 24. The deformation of the radially outermost ligament 26 can therefore be controlled by the advantageous determination of the angle θ between the nut contacting portion 31 and the rotor contacting portion 33 as seen in FIG. 7 where the nut contacting portion 31 deforms the radially outermost ligament 26 until the rotor contacting portion 33 contacts the outer surface of the rotor 11 preventing further deformation of the radially outermost ligament 26 as seen in FIG. 9. Therefore, the proper determination of the angle θ provides for sufficient deformation of the radially outermost ligament 26 to adequately engage the receiving pocket 15 to prevent rotation of the nut 24 while simultaneously preventing over straining of the radially outermost ligament 26.

The radially outermost ligament 26 is therefore configured to be deformed into the receiving pocket 5 to effectively prevent rotation of the nut 24 relative to the rotor bore 20. Therefore, once the radially outermost ligament 26 is deformed into the receiving pocket 15 by the tool 30, the radial position of the seal contacting surface 35 is fixed relative to the shoulder 25 and the compression of the seals 23 is preserved during operation of the generator 10 to properly seal against the escape of the hydrogen gas.

An advantage of the present invention is that any angular portion of the radially outermost ligament 26 can be deformed into the receiving pocket 15. The angular position of the nut 24 therefore is not dependant upon the relative angular position of the receiving pocket 15 as would be the case with a nut or system having predefined locking locations such as a hexagonal shaped spanner nut or a similar device that would require indexing a nut to a next nearest predefined locking location which could negatively effect an optimum compression of the seals 23. Therefore the angular position of the nut 24 is not required to be indexed to a predefined position for securing the nut 24 against rotation relative to the rotor body 11.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A system for securing a seal of an electric generator having a rotor with a radial conductor lead arranged in a radial lead bore of the rotor, comprising:
   a single receiving pocket arranged in a body of the rotor adjacent to and radially outward relative to the radial lead bore;
   a nut arranged coaxially with the radial conductor lead, the nut comprising:
   a seal contacting surface arranged at an axial face of the nut; and
   a radially outermost ligament arranged opposite the seal contacting surface, wherein any angular portion of the radially outermost ligament is deformed outwardly into the single receiving pocket to lock the nut against rotation about the radial lead, wherein an angular position of the nut is not dependent on an angular position of the single receiving pocket to lock the nut against rotation.

2. The system of claim 1, wherein the single receiving pocket is arranged remote from a rotor centerline axis location.

3. The system of claim 1, wherein the single receiving pocket does not encompass a location of relative maximum cyclic stress of the rotor adjacent to the radial lead.

4. The system of claim 1, wherein the single receiving pocket is arranged in a quadrant that contains a location of relative minimum cyclic stress of the rotor adjacent to the radial lead.

5. The system of claim 1, wherein the single receiving pocket opens into the radial lead bore.

6. The system of claim 1, wherein nut further comprises a radially innermost ligament separated from the radially outermost ligament by a circumferential groove.

7. The system of claim 1, further comprising a tool having a nut contacting portion and a lever portion arranged opposite the nut contacting portion, the nut contacting portion sized and configured to mate with the nut for deforming the portion of the radially outermost ligament of the nut into the single receiving pocket of the rotor.

8. An electric generator rotor radial lead seal arrangement, comprising:
   a rotor comprising a radial lead bore, and a single receiving pocket arranged adjacent to and radially outward relative to the radial lead bore on a surface of the rotor;
   a radial lead arranged in the radial lead bore;
   a compressible seal having an outer diameter configured to coaxially seal against the radial lead bore and an inner diameter configured to coaxially seal against the radial lead when the seal is compressed;
   a nut arranged on the radial lead the nut comprising:
   a contacting surface that compresses the compressible seal when the nut is threaded into the radial lead bore, and
   a ligament on a surface of the nut opposed the contacting surface;
   wherein any angular portion of the ligament may be deformed outwardly into the single receiving pocket to prevent rotation of the nut relative to the rotor, thereby maintaining a desired degree of compression on the seal, wherein an angular position of the nut is not dependent on an angular position of the single receiving pocket to lock the nut against rotation.

9. The arrangement of claim 8, wherein the receiving single pocket is arranged remote from a rotor centerline axis location.

10. The arrangement of claim 8, wherein the single receiving pocket does not encompass a location of relative maximum cyclic stress of the rotor adjacent to the radial lead.

11. The arrangement of claim 8, wherein the single receiving pocket is arranged in a quadrant that contains a location of relative minimum cyclic stress of the rotor adjacent to the radial lead.

12. The arrangement of claim 8, wherein the ligament is an outermost ligament, and further comprising an innermost ligament also disposed on the surface opposed the contacting surface.

13. The arrangement of claim 8, wherein the single receiving pocket opens into the radial lead bore.

* * * * *